United States Patent [19]

Nakamura

[11] Patent Number: 5,533,396

[45] Date of Patent: Jul. 9, 1996

[54] VIBRATING GYROSCOPE

[75] Inventor: Takeshi Nakamura, Uji, Japan

[73] Assignee: Murata Manufacturing Co., Ltd., Kyoto-Fu, Japan

[21] Appl. No.: 443,193

[22] Filed: May 17, 1995

[30] Foreign Application Priority Data

May 20, 1994 [JP] Japan .................................. 6-131297

[51] Int. Cl.$^6$ ...................................................... G01P 15/14
[52] U.S. Cl. ........................................................ 73/504.12
[58] Field of Search ........................ 73/504.12, 504.14, 73/504.02; 310/316, 338; 33/318

[56] References Cited

U.S. PATENT DOCUMENTS

| | | | |
|---|---|---|---|
| 5,220,833 | 6/1993 | Nakamura | 73/504.12 |
| 5,375,336 | 12/1994 | Nakamura | 364/443 |
| 5,412,204 | 5/1995 | Nakamura | 73/504.12 |

Primary Examiner—Hezron E. Williams
Assistant Examiner—Christine K. Oda
Attorney, Agent, or Firm—Nikaido, Marmelstein, Murray & Oram

[57] ABSTRACT

A vibrating gyroscope 10 includes a piezoelectric vibrator 12. Between a feedback piezoelectric element 16c and driving and detecting piezoelectric elements 16a and 16b of the piezoelectric vibrator 12, an amplifier circuit 24, a level changing circuit 26, a frequency dividing circuit 28, a phase correcting circuit 30, resistors 32a and 32b are connected. The piezoelectric elements 16a and 16b are connected to a non-inverting input terminal and an inverting input terminal of a first differential amplifier circuit 34. An output terminal of the first differential amplifier circuit 34 is connected to input terminals of a first and a second detecting circuits 36a and 36b. To other input terminals of the first and the second detecting circuits 36a and 36b, an output terminal of the amplifier circuit 24, a non-inverting output terminal and an inverting output terminal of the frequency dividing circuit 28 are connected. To the post-stages of the first and the second detecting circuits 36a and 36b, a first and a second smoothing circuits 38a and 38b, and a second and a third differential amplifier circuits 40 and 42 are connected.

3 Claims, 10 Drawing Sheets

PHASE (DEGREE)

PHASE (DEGREE)

PHASE (DEGREE)

PHASE (DEGREE)

VIBRATING GYROSCOPE

BACKGROUND OF THE INVENTION

1. Field of the Invention

The present invention relates to a vibrating gyroscope, and, more particularly, to a vibrating gyroscope that is applied to a navigation system which detects a position of a mobile by detecting its rotational angular velocity and guides it properly, a system for damping a vibration such as a device for protecting an unsteady hold which detects a rotational angular velocity due to an external vibration such as a hand vibration and damps it properly, or the like.

2. Description of the Prior Art

FIG. 11 is a circuit diagram showing an example of a conventional vibrating gyroscope. The vibrating gyroscope 1 includes a piezoelectric vibrator 2.

The piezoelectric vibrator 2 includes a regular triangular prism-shaped vibrating body 3, and on substantially center portions of three side faces of the vibrating body 3, three piezoelectric elements 4a, 4b and 4c are formed, respectively. In the piezoelectric vibrator 2, when similar driving signals are applied to, for example, the two piezoelectric elements 4a and 4b, the vibrating body 3 bends and vibrates in a direction perpendicular to a main surface of the piezoelectric element 4c. When no-rotation, similar detecting signals are obtained from the piezoelectric elements 4a and 4b. When a rotational angular velocity is applied to the piezoelectric vibrator 2 about a center axis of the vibrating body 3, the bending and vibrating direction of the vibrating body 3 is changed by a Coriolis force, and detecting signals corresponding to the rotational angular velocity are obtained from the piezoelectric elements 4a and 4b. In this case, corresponding to the rotational angular velocity, for example, a voltage of the detecting signal from one piezoelectric element 4a becomes larger, and a voltage of the detecting signal from the other piezoelectric element 4b becomes smaller.

The piezoelectric element 4c of the piezoelectric vibrator 2 is connected to an input terminal of an oscillation circuit 5 consisting of, for example, an amplifier. An output terminal of the oscillation circuit 5 is connected to ends of two resistors 6a and 6b, and the other ends of the resistors 6a and 6b are connected to the piezoelectric elements 4a and 4b, respectively. The piezoelectric elements 4a and 4b are connected to a non-inverting input terminal and an inverting input terminal of a differential amplifier circuit 7, respectively.

Accordingly, in the vibrating gyroscope 1, by an output signal from the differential amplifier circuit 7, it can be detected that a rotational angular velocity is not applied thereto, or a rotational angular velocity applied thereto can be detected.

However, in the vibrating gyroscope 1, when a resonance characteristic of the piezoelectric vibrator 2 is shifted by changing an atmospheric temperature or environment, there is a case where each detecting signal having a drift component besides the signal corresponding to the rotational angular velocity is obtained from the piezoelectric elements 4a and 4b.

Since the detecting signals are applied to the non-inverting input terminal and the inverting input terminal of the differential amplifier circuit 7, particularly when a rotational angular velocity is not applied to the vibrating gyroscope 1, a non-zero signal is obtained from an output terminal of the differential amplifier circuit 7, so that an offset change (drift) is generated. Thus, there is a problem where it can not be detected by the output signal from the differential amplifier circuit 7 that a rotational angular velocity is not applied to the vibrating gyroscope 1.

SUMMARY OF THE INVENTION

Therefore, it is a primary object of the present invention to provide a vibrating gyroscope capable of suppressing a drift.

The present invention is directed to a vibrating gyroscope comprising a circuit for generating a driving signal whose amplitude changes at every specific period, a piezoelectric vibrator which bends and vibrates at a constant amplitude by the driving signal, and outputs two detecting signals having different magnitudes corresponding to a rotational angular velocity applied thereto, a first differential amplifier circuit for detecting a differential signal between the two detecting signals, a first detecting circuit for detecting an output signal of the first differential amplifier circuit, a first smoothing circuit for smoothing an output signal of the first detecting circuit, a second detecting circuit for detecting the output signal of the first differential amplifier circuit, a second smoothing circuit for smoothing an output signal of the second detecting circuit, a second differential amplifier circuit for detecting a differential signal between an output signal of the first smoothing circuit and an output signal of the second smoothing circuit, and a third differential amplifier circuit for detecting a differential signal between the output signal of the first smoothing circuit and an output signal of the second differential amplifier circuit, wherein the first detecting circuit and the second detecting circuit are operated separately and intermittently in association with the specific period of the driving signal.

In the vibrating gyroscope according to the present invention, it is preferable for bending and vibrating the piezoelectric vibrator at a constant amplitude that the circuit for generating the driving signal includes a circuit for generating a standard signal whose amplitude is constant, a frequency dividing circuit for frequency dividing the standard signal, and a circuit for changing an amplitude of the standard signal corresponding to an output signal of the frequency dividing circuit, wherein the specific period is a period within a range wherein the amplitude of the piezoelectric vibrator does not fluctuate. Also, in this case, the first detecting circuit and the second detecting circuit are operated in association with the standard signal and the output signal of the frequency dividing circuit.

The piezoelectric vibrator bends and vibrates at a constant amplitude by the driving signal whose amplitude changes at every specific period. The piezoelectric vibrator outputs two detecting signals having different magnitudes corresponding to the rotational angular velocity applied thereto.

The differential signal between the two detecting signals is detected by the first differential amplifier circuit. When at least one detecting signal of the two detecting signals has a drift component, and the differential signal between the two detecting signals has the drift component, the output signal of the first differential amplifier circuit has a signal corresponding to the rotational angular velocity and the drift component. In this case, since the amplitude of the signal corresponding to the rotational angular velocity is proportional to the bending and vibrating amplitude of the piezoelectric vibrator, it becomes constant corresponding to the rotational angular velocity, but since the amplitude of the drift component is associated with the amplitude of the driving signal, it changes at every specific period.

The output signal of the first differential amplifier circuit is detected by the first detecting circuit, and at the same time, detected by the second detecting circuit. In this case, the first detecting circuit and the second detecting circuit are operated separately and intermittently in association with the specific period of the driving signal. Thus, the output signal of the first detecting circuit and the output signal of the second detecting circuit have the signals corresponding to the rotational angular velocity of same amplitude and the drift components of different amplitude.

The output signal of the first detecting circuit is smoothed by the first smoothing circuit. The output signal of the second detecting circuit is smoothed by the second smoothing circuit. The differential signal between the output signal of the first smoothing circuit and the output signal of the second smoothing circuit is detected by the second differential amplifier circuit. In this case, a signal corresponding to the rotational angular velocity in the output signal of the first detecting circuit and a signal corresponding to the rotational angular velocity in the output signal of the second detecting circuit are offset one another, and the output signal of the second differential amplifier circuit becomes a signal associated with the drift component.

The differential signal between the output signal of the first smoothing circuit and the output signal of the second differential amplifier circuit is detected by the third differential amplifier circuit. In this case, a signal associated with the drift component in the output signal of the first smoothing circuit is offset by the output signal of the second differential amplifier circuit, or a signal associated with the drift component, and the output signal of the third differential amplifier circuit becomes a signal, whose drift component is suppressed, associated with the rotational angular velocity in the output signal of the first smoothing circuit.

According to the present invention, it can obtain a vibrating gyroscope wherein even when the differential signal between the two detecting signals has a drift component, the drift component can be suppressed. Thus, in the vibrating gyroscope according to the present invention, even when there is a change of the atmospheric temperature or environment, a rotational angular velocity applied thereto can be detected accurately.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
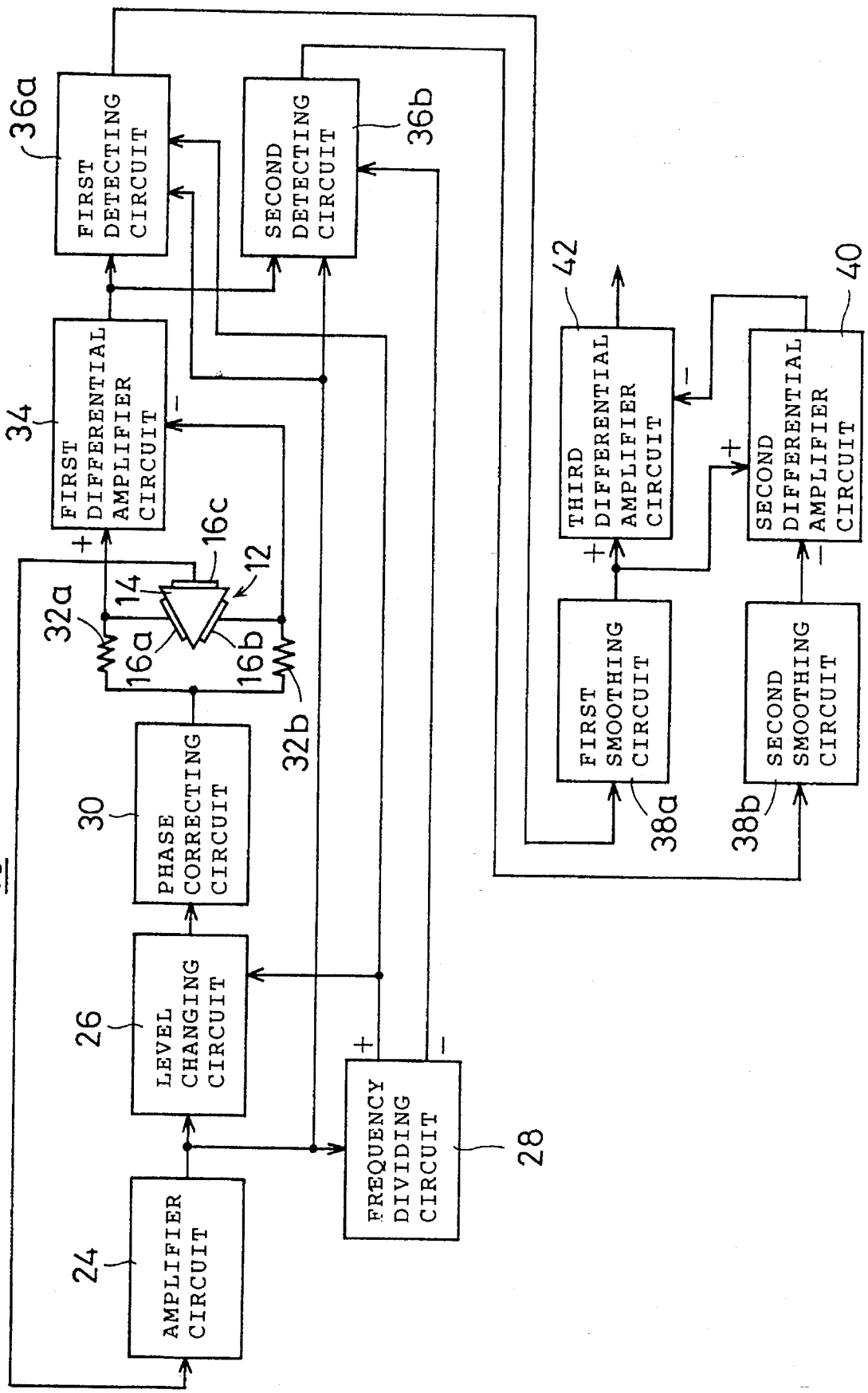
FIG. 1 is a block diagram showing an embodiment of the present invention.
Figure 11:
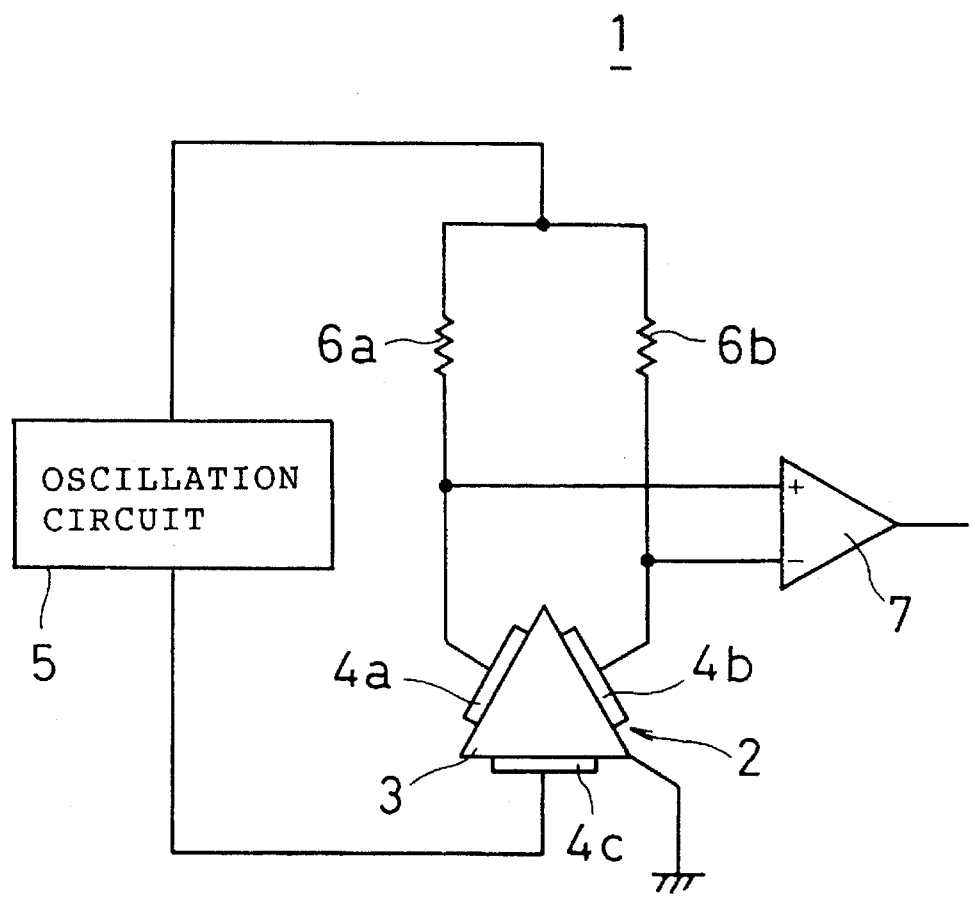
FIG. 11 is a circuit diagram showing an example of a conventional vibrating gyroscope.

FIG. 1 is a block diagram showing an embodiment of the present invention. A vibrating gyroscope 10 includes a piezoelectric vibrator 12 having the same configuration as the piezoelectric vibrator 2 of the vibrating gyroscope 1 shown in FIG. 11.

Figure 2:
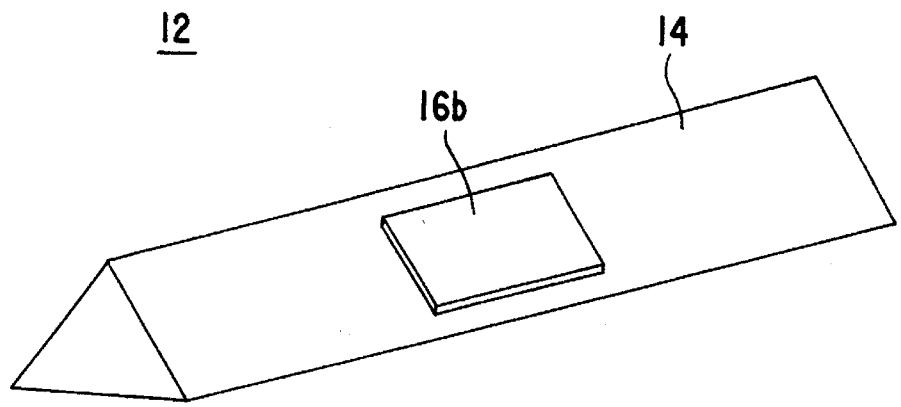
FIG. 2 is a perspective view showing a piezoelectric vibrator used in a vibrating gyroscope shown in FIG. 1.
Figure 3:
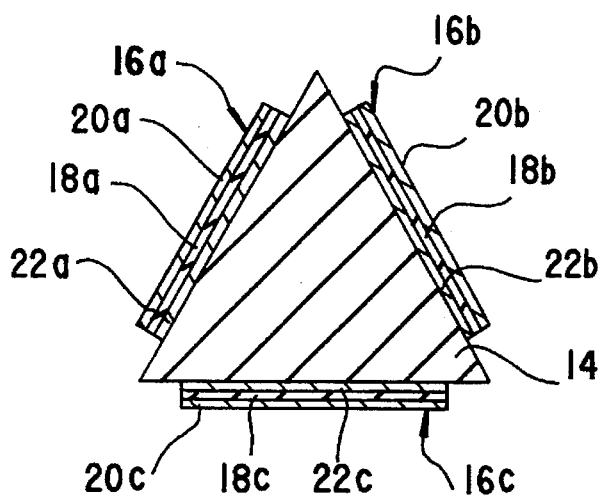
FIG. 3 is a sectional view of the piezoelectric vibrator shown in FIG. 2.

As shown in FIG. 2 and FIG. 3, the piezoelectric vibrator 12 includes, for example, a regular triangular prism-shaped vibrating body 14. The vibrating body 14 is formed with a material which generally generates a mechanical vibration such as elinver, iron-nickel alloy, quartz, glass, crystal, ceramics and the like. On substantially center portions of three side faces of the vibrating body 14, three piezoelectric elements 16a, 16b and 16c are formed, respectively. The piezoelectric elements 16a includes a piezoelectric layer 18a consisting of, for example, a piezoelectric ceramic and the like. On both main faces of the piezoelectric layer 18a, electrodes 20a and 22a are formed. One electrode 22a is bonded to the vibrating body 14 by means of an adhesive and the like. Similarly, the piezoelectric elements 16b and 16c include piezoelectric layers 18b and 18c, and on both main faces thereof, electrodes 20b, 22b and electrodes 20c, 22c are formed. The electrodes 22b and 22c are bonded to the vibrating body 14 by means of an adhesive and the like.

In this embodiment, for example, the two piezoelectric elements 16a and 16b of the piezoelectric vibrator 12 are used for driving and detecting, and the other piezoelectric element 16c is used for feedback.

As shown in FIG. 1, the feedback piezoelectric element 16c of the piezoelectric vibrator 12 is connected to an input terminal of an amplifier circuit 24. The amplifier circuit 24 is for amplifying an output signal of the feedback piezoelectric element 16c generated by bending and vibrating of the piezoelectric vibrator 12.

An output terminal of the amplifier circuit 24 is connected to an input terminal of a level changing circuit 26. Furthermore, the output terminal of the amplifier circuit 24 is connected to an input terminal of a frequency dividing circuit 28 consisting of, for example, a flip-flop circuit. A non-inverting output terminal of the frequency dividing circuit 28 is connected to another input terminal of the level changing circuit 26. The frequency dividing circuit 28 is for frequency dividing an output signal of the amplifier circuit 24 into a half frequency. The level changing circuit 26 is for changing an amplitude of an output signal of the amplifier circuit 24, based on a polarity of the output signal of the non-inverting output terminal of the frequency dividing circuit 28, or based on a polarity of a half frequency signal obtained by frequency dividing the output signal of the amplifier circuit 24 into the half frequency.

An output terminal of the level changing circuit 26 is connected to an input terminal of a phase correcting circuit 30. The phase correcting circuit 30 is for correcting a phase so that an oscillation takes place at a resonance point of the piezoelectric vibrator 12.

An output terminal of the phase correcting circuit 30 is connected to ends of resistors 32a and 32b, and other ends of the resistors 32a and 32b are connected to the driving and detecting piezoelectric elements 16a and 16b, respectively.

The piezoelectric elements 16a and 16b are connected to a non-inverting input terminal and an inverting input terminal of a first differential amplifier circuit 34, respectively. The first differential amplifier circuit 34 is for detecting a differential signal between two detecting signals obtained from the piezoelectric elements 16a and 16b.

An output terminal of the first differential amplifier circuit 34 is connected to an input terminal of a first detecting circuit 36a. To other two input terminals of the first detecting circuit 36a, the output terminal of the amplifier circuit 24 and the non-inverting output terminal of the frequency dividing circuit 28 are connected, respectively. The first detecting circuit 36a is for detecting the output signal of the first differential amplifier circuit 34 in synchronous with both the output signal of the amplifier circuit 24 and the output signal of the non-inverting output terminal of the frequency dividing circuit 28.

An output terminal of the first detecting circuit 36a is connected to an input terminal of a first smoothing circuit 38a. The first smoothing circuit 38a is for smoothing an output signal of the first detecting circuit 36a.

Furthermore, the output terminal of the first differential amplifier circuit 34 is connected to an input terminal of a second detecting circuit 36b. To other two input terminals of the second detecting circuit 36b, the output terminal of the amplifier circuit 24 and an inverting output terminal of the frequency dividing circuit 28 are connected, respectively. The second detecting circuit 36b is for detecting the output signal of the first differential amplifier circuit 34 in synchronous with both the output signal of the amplifier circuit 24 and the output signal of the inverting output terminal of the frequency dividing circuit 28.

An output terminal of the second detecting circuit 36b is connected to an input terminal of a second smoothing circuit 38b. The second smoothing circuit 38b is for smoothing an output signal of the second detecting circuit 36b.

An output terminal of the first smoothing circuit 38a and an output terminal of the second smoothing circuit 38b are connected to a non-inverting input terminal and an inverting input terminal of a second differential amplifier circuit 40, respectively. The second differential amplifier circuit 40 is for detecting a differential signal between an output signal of the first smoothing circuit 38a and an output signal of the second smoothing circuit 38b.

The output terminal of the first smoothing circuit 38a and an output terminal of the second differential amplifier circuit 40 are connected to a non-inverting input terminal and an inverting input terminal of a third differential amplifier circuit 42, respectively. The third differential amplifier circuit 42 is for detecting a differential signal between the output signal of the first smoothing circuit 38a and an output signal of the second differential amplifier circuit 40.

Then, the operation of the vibrating gyroscope 10 is described.

First, respective driving signals applied to the piezoelectric elements 16a and 16b of the piezoelectric vibrator 12 are described.

In the vibrating gyroscope 10, an oscillation loop for generating a driving signal is constituted by the piezoelectric vibrator 12, the amplifier circuit 24, the level changing circuit 26, the frequency dividing circuit 28, the phase correcting circuit 30, the resistors 32a and 32b, and the similar driving signals are applied to the piezoelectric elements 16a and 16b.

Figure 4:
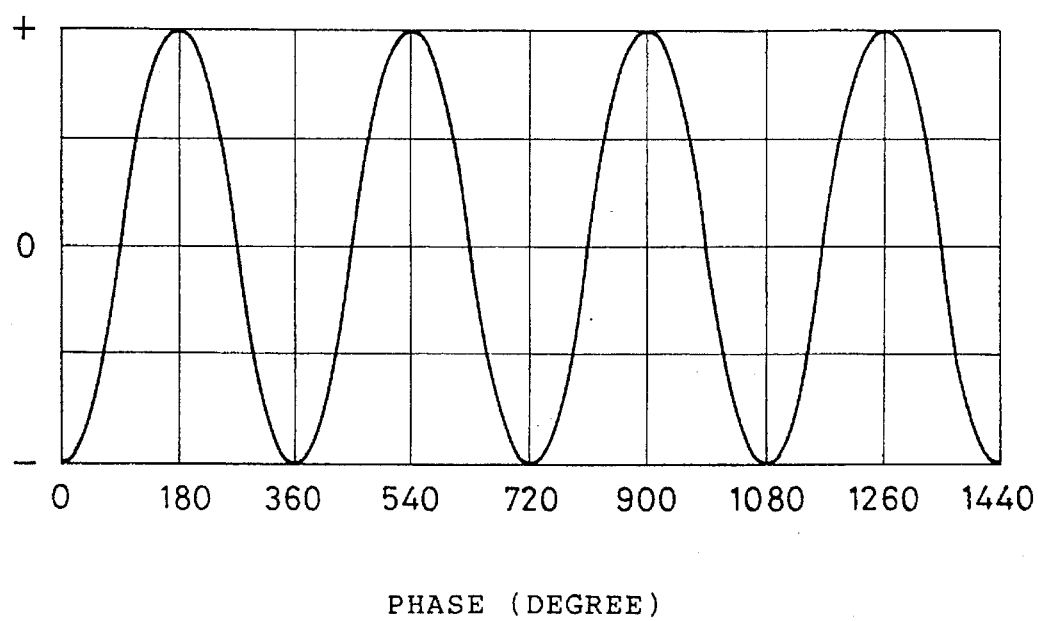
FIG. 4 is a graph showing an output signal of an amplifier circuit of the vibrating gyroscope shown in FIG. 1.

In this case, as shown in FIG. 4, the output signal of the amplifier circuit 24 becomes a sine-wave standard signal having a constant amplitude. The output signal of the amplifier circuit 24 is applied to the level changing circuit 26 and the frequency dividing circuit 28.

Figure 5A:
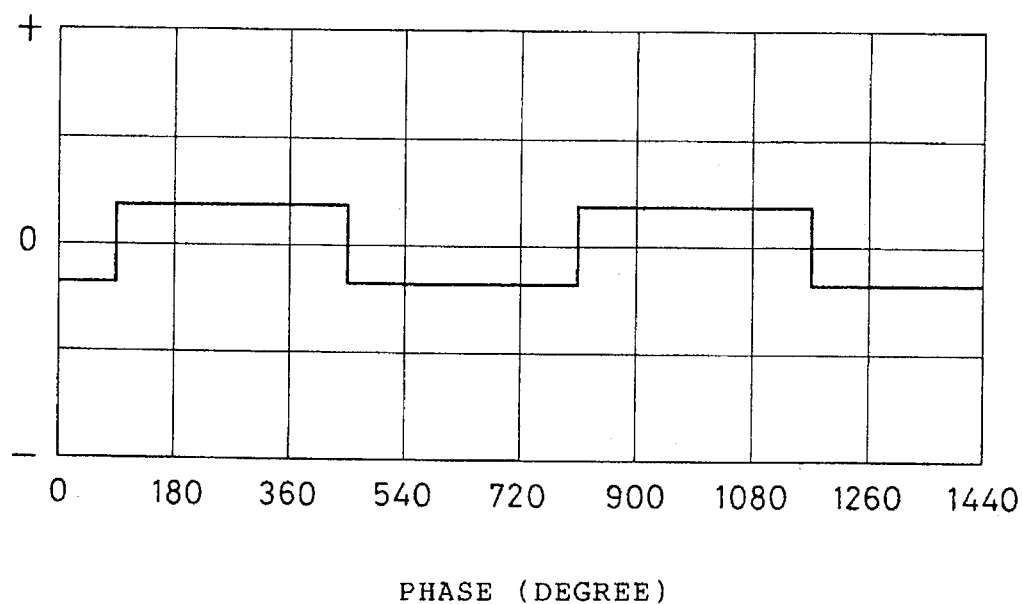
FIG. 5(A) and FIG. 5(B) are graphs respectively showing an output signal of a non-inverting output terminal and an output signal of an inverting output terminal of a frequency dividing circuit of the vibrating gyroscope shown in FIG. 1.
Figure 5B:
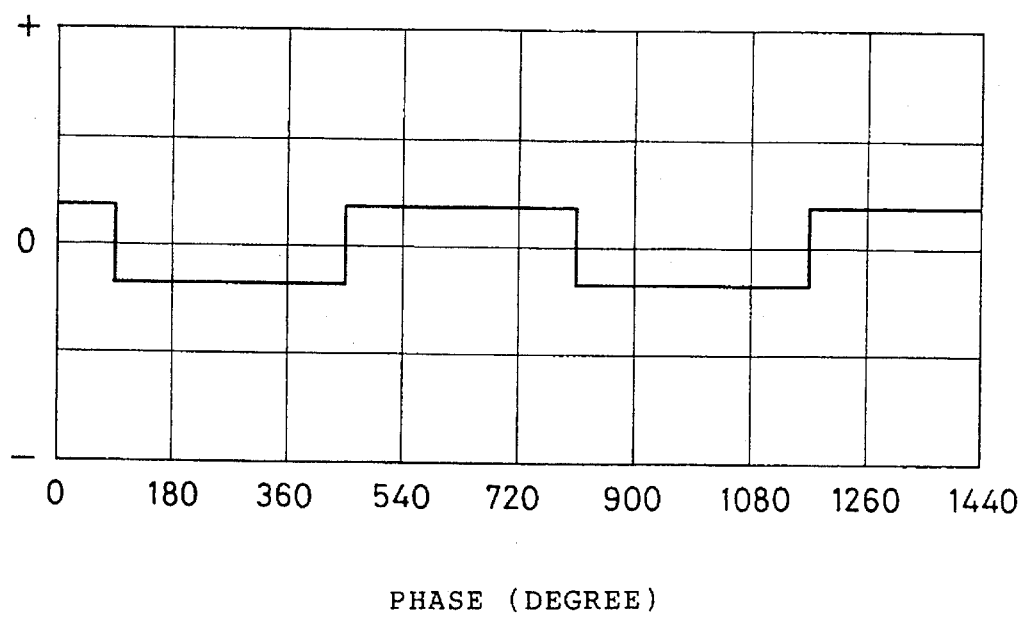

In the frequency dividing circuit 28, the output signal of the amplifier circuit 24 is frequency divided into a half frequency, and from the non-inverting output terminal thereof, as shown in FIG. 5(A), a half frequency signal obtained by frequency dividing the output signal of the amplifier circuit 24 into the half frequency is outputted. From the inverting output terminal of the frequency dividing circuit 28, as shown in FIG. 5(B), an inverted signal obtained by inverting the half frequency signal is outputted.

In the level changing circuit 26, an amplitude of the output signal of the amplifier circuit 24 is changed, based on a polarity of the output signal of the non-inverting output terminal of the frequency dividing circuit 28, or based on a polarity of the half frequency signal. In this case, the amplitude of the output signal of the amplifier circuit 24 is decreased when the half frequency signal is a positive signal, and is increased when the half frequency signal is a negative signal. Thus, the output signal of the level changing circuit 26 becomes a signal wherein the amplitude of the output signal of the amplifier circuit 24 is decreased or increased at every one period.

Figure 6:
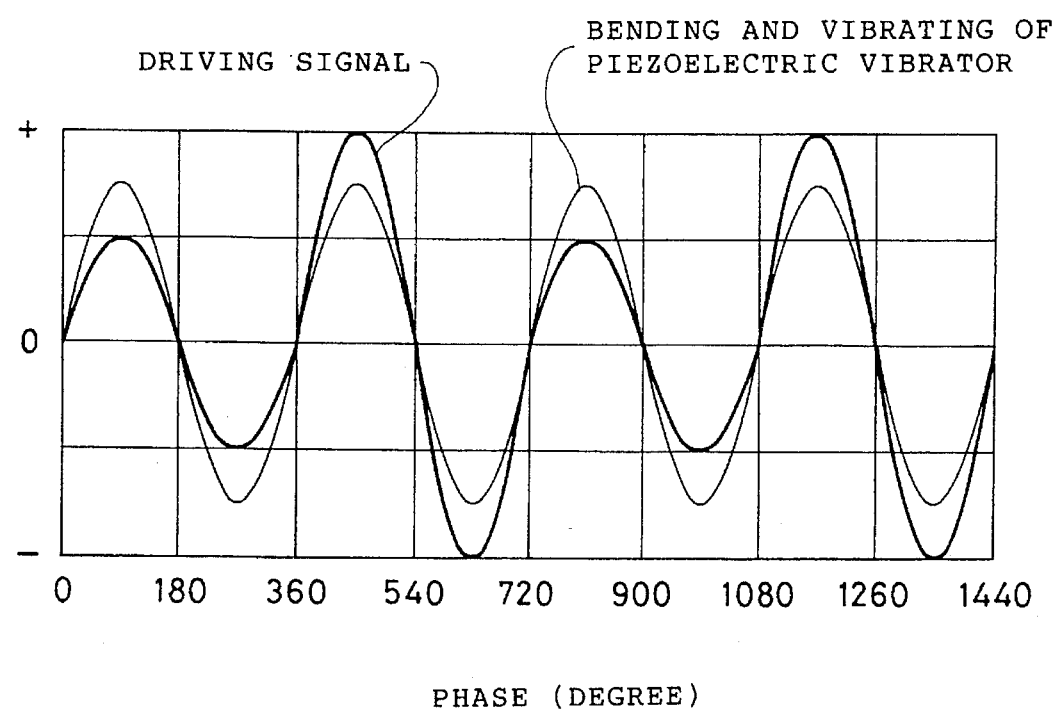
FIG. 6 is a graph showing a driving signal for driving the piezoelectric vibrator of the vibrating gyroscope shown in FIG. 1 and a bending and vibrating amplitude of the piezoelectric vibrator.

The output signal of the level changing circuit 26 is applied to the piezoelectric elements 16a and 16b as respective driving signals, via the phase correcting circuit 30 and the resistors 32a and 32b. In this case, by phase correction of the phase correcting circuit 30 and electrostatic capacities of the piezoelectric elements 16a and 16b, as shown in FIG. 6, the respective driving signals become a signal obtained by shifting a phase, by 90 degree, of the signal wherein the amplitude of the output signal of the amplifier circuit 24 is decreased or increased at every one period, or a signal obtained by shifting a phase of the output signal of the level changing circuit 26 by 90 degree. This is for producing the phase synchronizing with the Coriolis force.

Since the similar driving signals are applied to the piezoelectric elements 16a and 16b, the vibrating body 14 of the piezoelectric vibrator 12 bends and vibrates in a direction perpendicular to a main surface of the piezoelectric element 16c.

Though the amplitude of each of the driving signals is decreased or increased at every one period, the piezoelectric vibrator 12 can not follow the change of the amplitude of each of the driving signals, and as shown in FIG. 6, it bends and vibrates at a constant amplitude. Thus, a sine-wave signal of a constant amplitude is obtained from the piezoelectric element 16c, and the sine-wave signal of a constant amplitude is applied to the input terminal of the amplifier circuit 24.

Thus, in the vibrating gyroscope 10, regardless of the amplitude of the driving signal is decreased or increased at every one period, a feedback signal is stabilized and the piezoelectric vibrator 12 bends and vibrates at a constant amplitude.

In the vibrating gyroscope 10, as mentioned above, since the similar driving signals are applied to the two piezoelectric elements 16a and 16b, the vibrating body 14 of the piezoelectric vibrator 12 bends and vibrates in a direction perpendicular to the main surface of the piezoelectric element 16c, and when no-rotation (when any rotational angular velocity is not applied), the similar detecting signals are obtained from the piezoelectric elements 16a and 16b, respectively. When a rotational angular velocity is applied to the piezoelectric vibrator 12 of the vibrating gyroscope 10 about a center axis of the vibrating body 14, the bending and vibrating direction of the vibrating body 14 is changed by the Coriolis force, and the detecting signals corresponding to the rotational angular velocity are obtained from the piezoelectric elements 16a and 16b. In this case, corresponding to the magnitude of the rotational angular velocity, for example, a positive phase detecting signal is obtained from the piezoelectric element 16a, and a negative phase detecting signal is obtained from the piezoelectric element 16b.

In the vibrating gyroscope 10, a differential signal between the detecting signal obtained from the piezoelectric element 16a and the detecting signal obtained from the piezoelectric element 16b is detected by the first differential amplifier circuit 34. In this case, since the amplitudes and the phases of the driving signals in the detecting signals are the same, the driving signals in the detecting signals are offset by the first differential amplifier circuit 34. Thus, the output signal of the first differential amplifier circuit 34 becomes a signal corresponding to the rotational angular velocity.

However, when changing an atmospheric temperature or environment, there is a case where at least one detecting signal has a drift component besides the driving signal and the signal corresponding to the rotational angular velocity. In this case, the output signal of the first differential amplifier circuit 34 has the drift component besides the signal corresponding to the rotational angular velocity.

Now, a case, where at least one detecting signal of the two detecting signals obtained from the piezoelectric elements 16a and 16b has a drift component, and the differential signal between the two detecting signals has the signal corresponding to the rotational angular velocity and the drift component, is described.

In this case, the output signal of the first differential amplifier circuit 34 has the signal corresponding to the rotational angular velocity and the drift component.

An amplitude of the signal corresponding to the rotational angular velocity is proportional to the bending and vibrating amplitude of the piezoelectric vibrator 12. The bending and vibrating amplitude of the piezoelectric vibrator 12 is constant. Thus, the amplitude of the signal corresponding to the rotational angular velocity in the output signal of the first differential amplifier circuit 34 becomes constant corresponding to the rotational angular velocity. Furthermore, since the signal corresponding to the rotational angular velocity in the output signal of the first differential amplifier circuit 34 is proportional to the bending and vibrating amplitude velocity of the piezoelectric vibrator 12, it has a phase difference of 90 degree from the driving signal.

Since the drift component is produced in association with the driving signal, an amplitude of the drift component is decreased or increased at every one period as same as the amplitude of the driving signal. Furthermore, when there is a phase shift in the drift component, the drift component has a phase difference of 90 degree from the driving signal by differential division.

Figure 7:
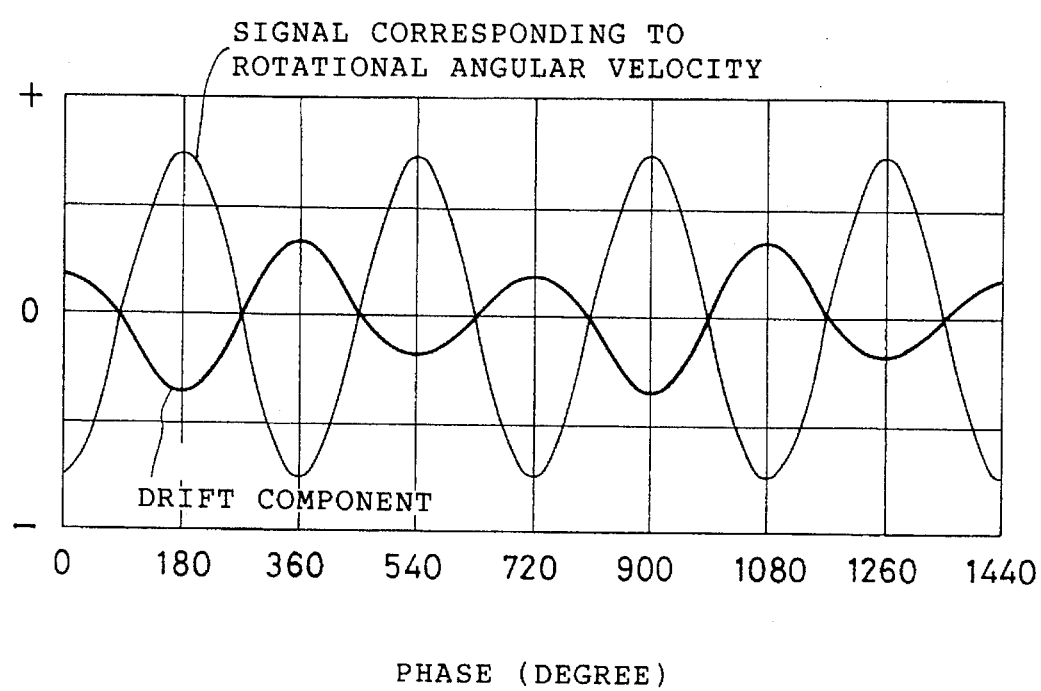
FIG. 7 is a graph showing an example of an output signal of a first differential amplifier circuit of the vibrating gyroscope shown in FIG. 1.

Thus, as shown in FIG. 7, the output signal of the first differential amplifier circuit 34 has a signal corresponding to the rotational angular velocity, whose amplitude is constant, having a phase difference of 90 degree from the driving signal, and a drift component, whose amplitude is decreased or increased at every one period, having a phase difference of 90 degree from the driving signal. In the output signal, there is a case where a polarity of the signal corresponding to the rotational angular velocity becomes reverse when applying a reverse rotational angular velocity, and a polarity of the drift component becomes reverse by changing an atmospheric temperature or environment or a direction of drift.

Figure 8A:
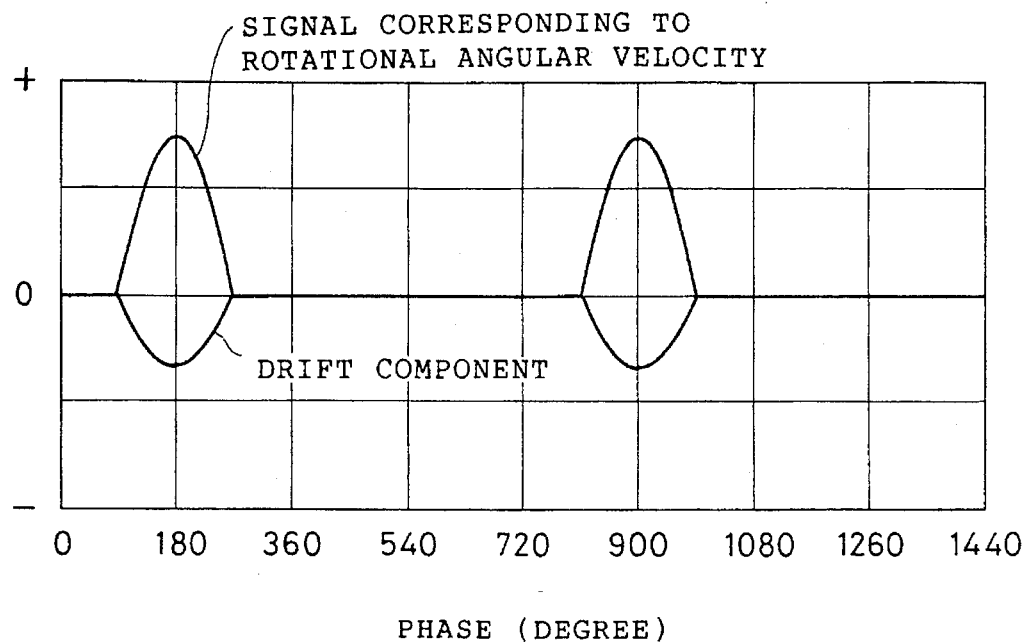
FIG. 8(A) and FIG. 8(B) are graphs respectively showing an example of an output signal of a first detecting circuit and an example of an output signal of a first smoothing circuit of the vibrating gyroscope shown in FIG. 1.
Figure 8B:
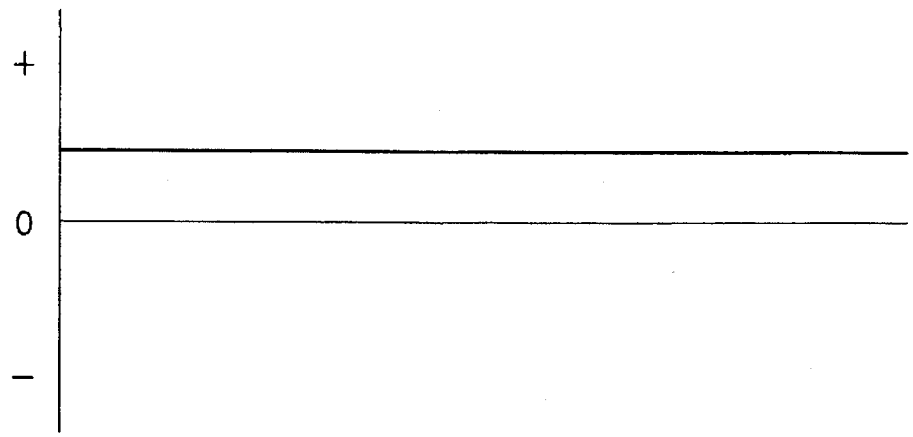

The output signal of the first differential amplifier circuit 34 is detected by the first detecting circuit 36a in synchronous with both a positive portion of the output signal of the amplifier circuit 24 and a positive portion of the half frequency signal of the frequency dividing circuit 28. Thus, the output signal of the first differential amplifier circuit 34 is subjected to half-wave rectification by the first detecting circuit 36a at a portion having a drift component of a large amplitude. Thus, as shown in FIG. 8(a), the output signal of the first detecting circuit 36a has a positive portion of the signal corresponding to the rotational angular velocity, and a negative portion of the drift component having a large amplitude. The output signal of the first detecting circuit 36a is smoothed by the first smoothing circuit 38a. Thus, as shown in FIG. 8(B), the output signal of the first smoothing circuit 38a becomes a DC signal obtained by rectifying the signal corresponding to the rotational angular velocity and the drift component having a large amplitude.

Figure 9A:
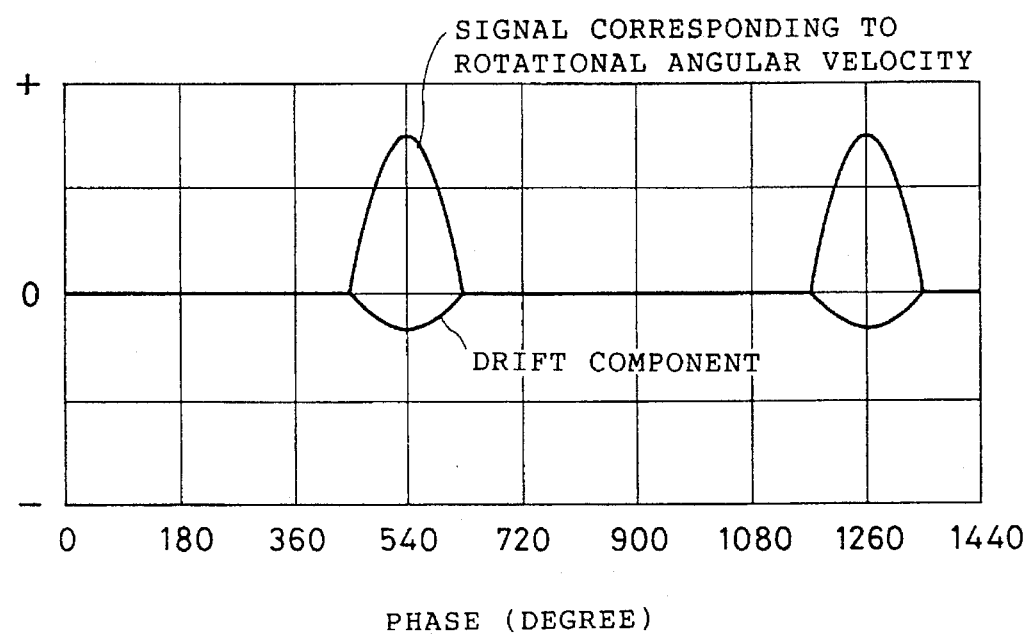
FIG. 9(A) and FIG. 9(B) are graphs respectively showing an example of an output signal of a second detecting circuit and an example of an output signal of a second smoothing circuit of the vibrating gyroscope shown in FIG. 1.
Figure 9B:
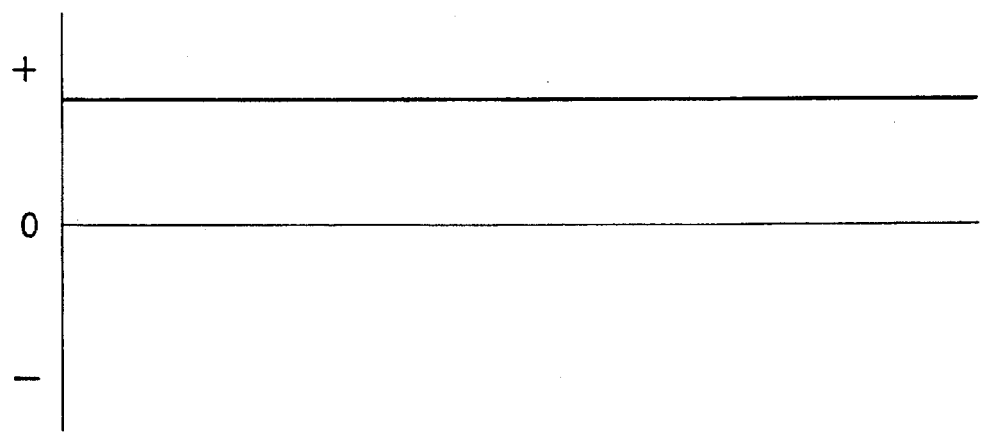
Figure 10:
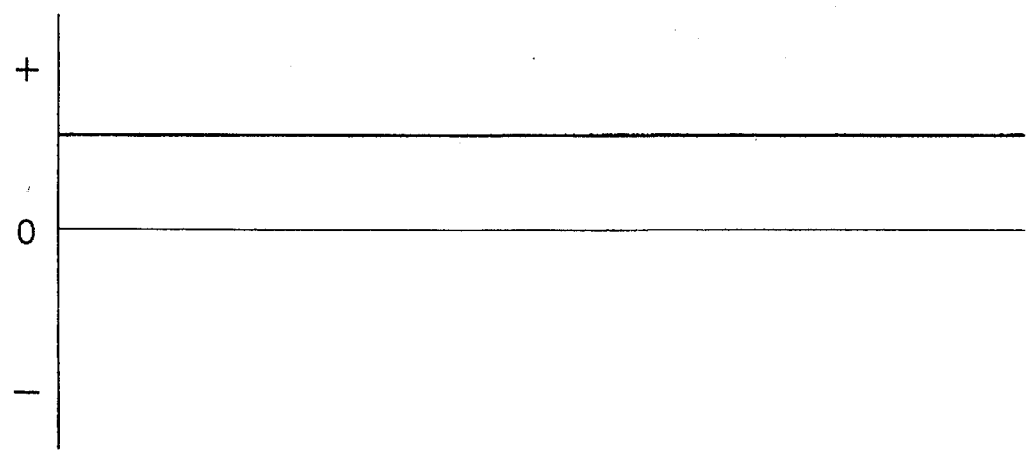
FIG. 10 is a graph showing an example of an output signal of a third differential amplifier circuit of the vibrating gyroscope shown in FIG. 1.

Furthermore, the output signal of the first differential amplifier circuit 34 is detected by the second detecting circuit 36b in synchronous with both the positive portion of the output signal of the amplifier circuit 24 and a positive portion of an inverted signal of the frequency dividing circuit 28. Thus, the output signal of the first differential amplifier circuit 34 is subjected to half-wave rectification by the second detecting circuit 36b at a portion having a drift component of a small amplitude. Thus, as shown in FIG. 9(A), the output signal of the second detecting circuit 36b has a positive portion of the signal corresponding to the rotational angular velocity, and a negative portion of the drift component having a small amplitude. The output signal of the second detecting circuit 36b is smoothed by the second smoothing circuit 38b. Thus, as shown in FIG. 9(B), the output signal of the second smoothing circuit 38b becomes a DC signal obtained by rectifying the signal corresponding to the rotational angular velocity and the drift component having a small amplitude.

In the second differential amplifier circuit 40, a differential signal between the output signal of the first smoothing circuit 38a and the output signal of the second smoothing circuit 38b is detected. In this case, by the second differential amplifier circuit 40, a signal corresponding to the rotational angular velocity in the output signal of the first smoothing circuit 38a and a signal corresponding to the rotational angular velocity in the output signal of the second smoothing circuit 38b are offset, and a DC signal obtained by rectifying the drift component is obtained from the output terminal of the second differential amplifier circuit 40.

Furthermore, in the third differential amplifier circuit 42, a differential signal between the output signal of the first smoothing circuit 38a and the output signal of the second differential amplifier circuit 40 is detected. In this case, a drift component in the output signal of the first smoothing circuit 38a and the output signal of the second differential amplifier circuit 40 that is a drift component are offset, and from an output terminal of the third differential amplifier circuit 42, a DC signal obtained by rectifying the signal corresponding only to the rotational angular velocity is obtained.

As mentioned above, in the vibrating gyroscope 10, even when at least one detecting signal of the two detecting signals obtained from the piezoelectric elements 16a and 16b includes the drift component besides the driving signal and the signal corresponding to the rotational angular velocity, since the DC signal associated with the signal corresponding to the rotational angular velocity is obtained from the output terminal of the third differential amplifier circuit 42, only the rotational angular velocity can be detected from the output signal of the third differential amplifier circuit 42.

In the vibrating gyroscope 10, when the applied rotational angular velocity is zero, even when at least one detecting signal of the two detecting signals obtained from the piezoelectric elements 16a and 16b includes the drift component besides the driving signal and the signal corresponding to the rotational angular velocity, the signal corresponding to the rotational angular velocity becomes zero, and an output signal of zero is obtained from the third differential amplifier circuit 42.

In the above-mentioned embodiment, though the amplitude of the driving signal is decreased or increased at every one period by the frequency dividing circuit and so on, in the present invention, the amplitude of the driving signal may be decreased or increased at every several periods besides one period. In this case, a frequency dividing circuit of two times the periods, at which the amplitude of the driving signal is decreased or increased, may be used. However, it is particularly preferable to decrease or increase the amplitude of the driving signal at every one period than to decrease or increase at every several periods, from the view point of bending and vibrating the piezoelectric vibrator 12 at a constant amplitude.

In the above-mentioned embodiment, though the output signal of the first differential amplifier circuit is subjected to half-wave rectification, respectively at the portion having the drift component of the large amplitude and the portion having the drift component of the small amplitude, in the present invention, the output signal of the first differential amplifier circuit may be subjected to all-wave rectification, respectively at the portion having the drift component of the large amplitude and the portion having the drift component of the small amplitude. By such all-wave rectification, the signals obtained after smoothing become larger, results in a good efficiency.

Furthermore, in the above-mentioned embodiment, though the driving signal wherein the amplitude of the sine-wave standard signal changes at every specific period is used, in the present invention, a driving signal wherein an amplitude of a standard signal having a wave from such as a rectangular wave besides the sine-wave changes at every specific period may be used.

In the above-mentioned embodiment, though the piezoelectric vibrator having the regular triangular prism-shaped vibrating body and the three piezoelectric elements formed on the surface thereof is used, in the present invention, a piezoelectric vibrator wherein a piezoelectric element is formed on a columnar vibrating body of, for example, a quadrangular prism, a hexagonal prism, an octagonal prism and a circular cylinder, or a piezoelectric vibrator wherein a piezoelectric element is formed on a turning-fork type vibrating body of, for example, an H type besides the columnar type may be used. In the above-mentioned embodiment, though one electrode of the piezoelectric element is bonded to the vibrating body, the piezoelectric layer may be formed directly on the surface of the vibrating body by an well-known thin-film forming technique without forming the electrode.

Furthermore, in the above-mentioned embodiment, though the piezoelectric vibrator wherein the piezoelectric elements is formed on the vibrating body is used, in the present invention, a piezoelectric vibrator wherein an electrode formed on the surface of a vibrating body consisting of a piezoelectric material may be used. Also, a shape of the piezoelectric vibrator is not restricted as same as aforementioned.

It will be apparent from the foregoing that, while the present invention has been described in detail and illustrated, these are only particular illustration and example, and the present invention is not limited to these. The spirit and scope of the present invention is limited only by the appended claims.

What is claimed is:

1. A vibrating gyroscope comprising:

a circuit for generating a driving signal whose amplitude changes at every specific period;

a piezoelectric vibrator which bends and vibrates at a constant amplitude by said driving signal, and outputs two detecting signals having different magnitudes corresponding to a rotational angular velocity applied thereto;

a first differential amplifier circuit for detecting a differential signal between said two detecting signals;

a first detecting circuit for detecting an output signal of said first differential amplifier circuit;

a first smoothing circuit for smoothing an output signal of said first detecting circuit;

a second detecting circuit for detecting the output signal of said first differential amplifier circuit;

a second smoothing circuit for smoothing an output signal of said second detecting circuit;

a second differential amplifier circuit for detecting a differential signal between an output signal of said first smoothing circuit and an output signal of said second smoothing circuit; and a third differential amplifier circuit for detecting a differential signal between the output signal of said first smoothing circuit and an output signal of said second differential amplifier circuit; wherein said first detecting circuit and said second detecting circuit are operated separately and intermittently in association with said specific period of said driving signal.

2. A vibrating gyroscope according to claim 1, wherein said circuit for generating said driving signal includes a circuit for generating a standard signal whose amplitude is constant;

a frequency dividing circuit for frequency dividing said standard signal; and a circuit for changing an amplitude of said standard signal corresponding to an output signal of said frequency dividing circuit; wherein said specific period is a period within a range wherein the amplitude of said piezoelectric vibrator does not fluctuate.

3. A vibrating gyroscope according to claim 2, wherein said first detecting circuit and said second detecting circuit are operated in association with said standard signal and the output signal of said frequency dividing circuit.

* * * * *